United States Patent
Welter et al.

(10) Patent No.: US 9,421,832 B2
(45) Date of Patent: Aug. 23, 2016

(54) AIR MAINTENANCE TIRE

(71) Applicant: The Goodyear Tire & Rubber Company, Akron, OH (US)

(72) Inventors: Carolin Anna Welter, Schleich (DE); Dinesh Chandra, Stow, OH (US); Robert Allen Losey, Kent, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 184 days.

(21) Appl. No.: 14/157,587

(22) Filed: Jan. 17, 2014

(65) Prior Publication Data
US 2014/0216621 A1 Aug. 7, 2014

Related U.S. Application Data

(60) Provisional application No. 61/760,298, filed on Feb. 4, 2013.

(51) Int. Cl.
*B60C 23/12* (2006.01)

(52) U.S. Cl.
CPC ......... *B60C 23/12* (2013.01); *Y10T 152/10495* (2015.01)

(58) Field of Classification Search
CPC ....................................................... B60C 23/12
USPC ................................................ 152/419, 426
See application file for complete search history.

(56) References Cited

U.S. PATENT DOCUMENTS

| | | | | |
|---|---|---|---|---|
| 7,225,845 B2 * | 6/2007 | Ellmann | ................. | B60C 23/12 152/419 |
| 7,318,464 B2 | 1/2008 | Hahn et al. | | |
| 8,042,586 B2 * | 10/2011 | Losey | ..................... | B60C 23/12 152/415 |
| 8,113,254 B2 * | 2/2012 | Benedict | ................. | B60C 23/12 152/419 |
| 8,156,978 B1 * | 4/2012 | Hinque | ................... | B60C 23/12 152/419 |
| 8,291,950 B2 * | 10/2012 | Hinque | ................... | B60C 23/12 152/419 |
| 8,381,784 B2 * | 2/2013 | Delgado | ................. | B60C 23/12 152/415 |
| 8,381,785 B2 * | 2/2013 | Losey | ..................... | B60C 23/12 152/415 |
| 8,534,335 B2 * | 9/2013 | Benedict | ................. | B60C 23/12 152/419 |
| 8,573,270 B2 * | 11/2013 | Hinque | ................... | B60C 23/12 152/419 |
| 8,651,155 B2 * | 2/2014 | Hinque | ............... | B60C 23/0493 152/418 |
| 8,656,972 B2 * | 2/2014 | Hinque | ................... | B60C 23/12 152/418 |
| 8,662,127 B2 * | 3/2014 | Hinque | ................... | B60C 23/12 152/418 |
| 8,695,661 B2 * | 4/2014 | Delgado | ................. | B60C 23/12 152/415 |
| 8,746,306 B2 * | 6/2014 | Hinque | ................. | B60C 19/002 152/419 |

(Continued)

*Primary Examiner* — Jeffrey J Restifo
(74) *Attorney, Agent, or Firm* — John D. DeLong

(57) ABSTRACT

An air maintenance tire and pump assembly comprising: a tire having two spaced inextensible beads; a ground contacting tread portion; a pair of individual sidewalls extending radially inward from the axial outer edges of said tread portion to join the respective beads; a supporting carcass for the tread portion and sidewalls; an innerliner disposed radially inward of the carcass, the innerliner having a innerliner surface facing an interior cavity of the tire; an elongate substantially annular air passageway enclosed within a bending region of the tire, the air passageway operatively closing and opening segment by segment as the bending region of the tire passes through a rolling tire footprint to pump air along the air passageway; an air inlet port assembly coupled to and in air flow communication with the air passageway at an inlet air passageway junction, the air inlet port assembly operable to channel inlet air from outside of the tire into the air passageway, the air inlet port assembly comprising a regulator assembly, the regulator assembly having a mounting surface; the mounting surface adhered to the innerliner surface with a silicone adhesive.

1 Claim, 2 Drawing Sheets

(56) References Cited

U.S. PATENT DOCUMENTS

| | | | | |
|---|---|---|---|---|
| 8,826,955 B2* | 9/2014 | Delgado | B60C 23/12 | 152/419 |
| 8,852,371 B2* | 10/2014 | Hinque | B29D 30/0061 | 152/426 |
| 8,857,484 B2* | 10/2014 | Hinque | B60C 23/12 | 152/419 |
| 8,944,126 B2* | 2/2015 | Frantzen | B60C 19/00 | 152/424 |
| 8,960,249 B2* | 2/2015 | Lin | B60C 23/12 | 152/419 |
| 8,991,456 B2* | 3/2015 | Gobinath | B60C 23/12 | 152/419 |
| 9,114,673 B2* | 8/2015 | Gobinath | B60C 23/12 | |
| 2002/0092592 A1* | 7/2002 | Huang | B60C 23/12 | 152/419 |
| 2006/0021690 A1* | 2/2006 | Bunker | B60C 23/12 | 152/419 |
| 2007/0018804 A1 | 1/2007 | Strache et al. | | |
| 2010/0243121 A1* | 9/2010 | Eigenbrode | B60C 23/12 | 152/419 |
| 2011/0146867 A1* | 6/2011 | Benedict | B60C 23/12 | 152/426 |
| 2011/0146868 A1* | 6/2011 | Losey | B60C 23/12 | 152/426 |
| 2013/0032262 A1* | 2/2013 | Bormann | B60C 19/002 | 152/450 |
| 2013/0048176 A1* | 2/2013 | Hinque | B60C 23/12 | 152/450 |
| 2014/0102621 A1* | 4/2014 | Losey | B60C 23/12 | 156/95 |
| 2014/0116601 A1* | 5/2014 | Bormann | B60C 19/002 | 156/117 |
| 2014/0150945 A1* | 6/2014 | Kumar | B60C 23/12 | 152/450 |
| 2014/0158267 A1* | 6/2014 | Gobinath | B60C 19/00 | 152/450 |
| 2014/0360643 A1* | 12/2014 | Collette | B60C 23/12 | 152/450 |
| 2015/0041036 A1* | 2/2015 | Lin | B60C 23/12 | 152/450 |
| 2015/0059947 A1* | 3/2015 | Power | B60C 23/12 | 152/419 |
| 2015/0059950 A1* | 3/2015 | Hinque | B60C 23/12 | 152/450 |
| 2015/0059951 A1* | 3/2015 | Hinque | B60C 23/12 | 152/450 |
| 2015/0090386 A1* | 4/2015 | Lin | B60C 23/12 | 152/450 |
| 2015/0122387 A1* | 5/2015 | Gobinath | B60C 23/12 | 152/418 |
| 2015/0158350 A1* | 6/2015 | Hinque | B60C 23/12 | 152/450 |
| 2015/0165836 A1* | 6/2015 | Lamgaday | B60C 23/12 | 152/450 |
| 2015/0165837 A1* | 6/2015 | Lamgaday | B60C 23/12 | 152/450 |
| 2015/0165838 A1* | 6/2015 | Benedict | B60C 23/12 | 152/450 |
| 2015/0165843 A1* | 6/2015 | Welter | B60C 23/12 | 152/450 |
| 2015/0174973 A1* | 6/2015 | Hinque | B60C 23/12 | 152/450 |
| 2015/0306924 A1* | 10/2015 | Benedict | B60C 23/12 | 152/426 |

* cited by examiner

AIR MAINTENANCE TIRE

FIELD OF THE INVENTION

The invention relates generally to air maintenance tires and, more specifically, to a tire and integrated pump assembly.

BACKGROUND OF THE INVENTION

Normal air diffusion reduces tire pressure over time. The natural state of tires is under inflated. Accordingly, drivers must repeatedly act to maintain tire pressures or they will see reduced fuel economy, tire life and reduced vehicle braking and handling performance. Tire Pressure Monitoring Systems have been proposed to warn drivers when tire pressure is significantly low. Such systems, however, remain dependant upon the driver taking remedial action when warned to re-inflate a tire to recommended pressure. It is a desirable, therefore, to incorporate an air maintenance feature within a tire that will maintain correct air pressure within the tire without a need for driver intervention to compensate for any reduction in tire pressure over time.

SUMMARY OF THE INVENTION

The present invention is directed to an air maintenance tire and pump assembly comprising:

a tire having two spaced inextensible beads; a ground contacting tread portion; a pair of individual sidewalls extending radially inward from the axial outer edges of said tread portion to join the respective beads; a supporting carcass for the tread portion and sidewalls; an innerliner disposed radially inward of the carcass, the innerliner having a innerliner surface facing an interior cavity of the tire;

an elongate substantially annular air passageway enclosed within a bending region of the tire, the air passageway operatively closing and opening segment by segment as the bending region of the tire passes through a rolling tire footprint to pump air along the air passageway;

an air inlet port assembly coupled to and in air flow communication with the air passageway at an inlet air passageway junction, the air inlet port assembly operable to channel inlet air from outside of the tire into the air passageway, the air inlet port assembly comprising a regulator assembly, the regulator assembly having a mounting surface;

the mounting surface adhered to the innerliner surface with a silicone adhesive.

BRIEF DESCRIPTION OF THE DRAWINGS

The invention will be described by way of example and with reference to the accompanying drawings in which.

DETAILED DESCRIPTION OF THE INVENTION

Figure 1:
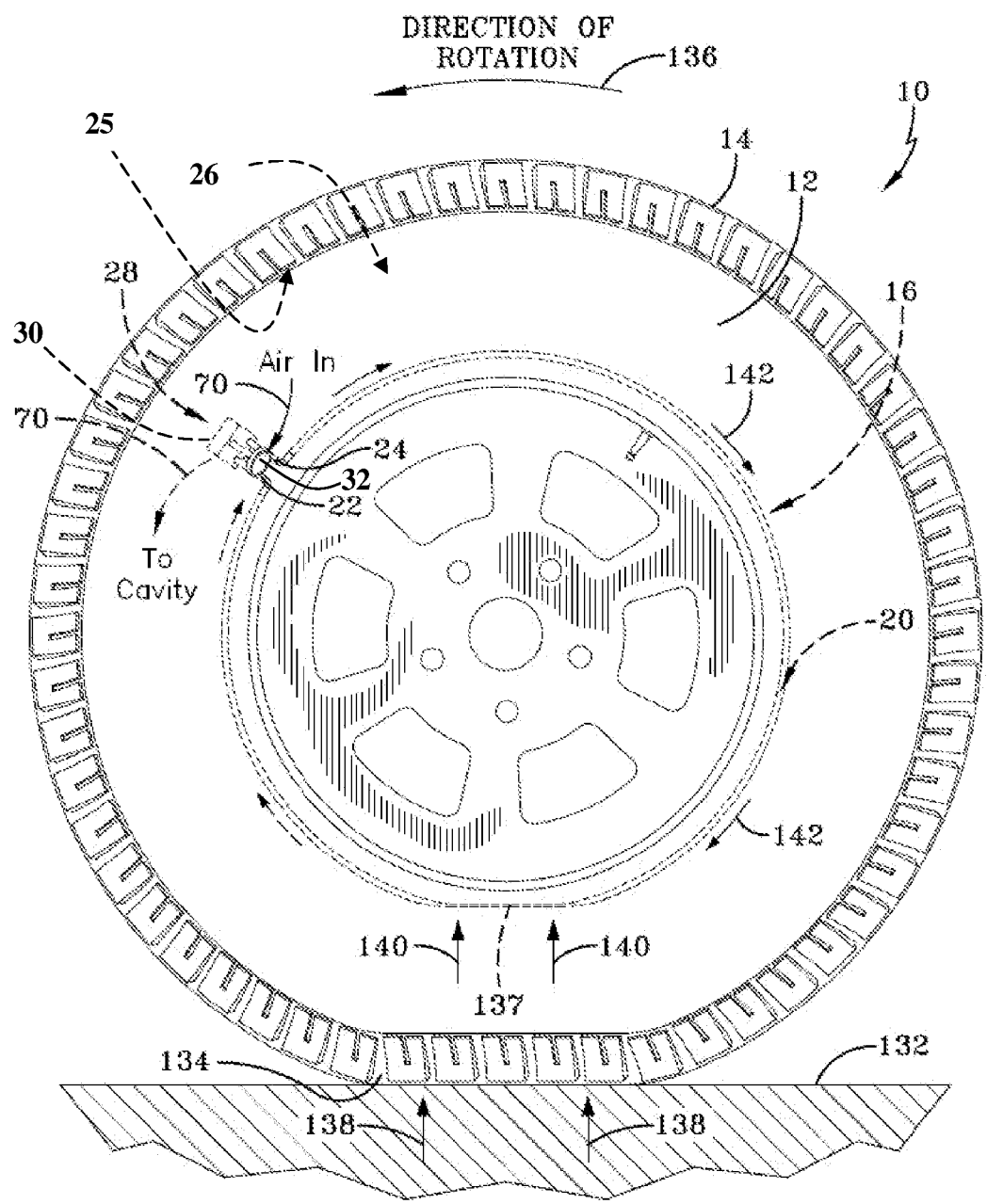
FIG. 1 is an isometric view of tire, rim and tubing with peristaltic pump and inlet valve.

Referring to FIG. 1, a tire and pump assembly includes a tire 10 of conventional construction having a pair of sidewalls 12 extending to a tread 14 and enclosing a tire air cavity 26 defined by a tire inner liner layer 25. A peristaltic pump assembly 16 is attached to one or both of the tire sidewalls 12 in generally a high bend region of the sidewall. The peristaltic pump assembly 16 includes an annular air passageway 20 either in the form of an independent tube formed separately from the tie and assembled to the tire in a post-manufacture procedure; or an air passageway formed as an integral void within the sidewall during tire manufacture. The air passageway 20 is enclosed by the sidewall and extends along an annular path about a region of the sidewall that experiences a high flex or bend as the tire rotates. If in an independent tube form, the air passageway tube is formed of a resilient, flexible material such as plastic or rubber compounds that are capable of withstanding repeated deformation cycles wherein the tube is deformed into a flattened condition subject to external force and, upon removal of such force, returns to an original condition generally circular in cross-section. If the air passageway is integrally formed within the sidewall, the air passageway likewise must withstand repeated deformation and recovery cycles as the tire rotates and be of a diameter sufficient to operatively pass a volume of air sufficient for the purposes described herein. The general operation of an air tube in a peristaltic pump is described in U.S. Pat. No. 8,113,254 which is incorporated herein by reference.

Opposite ends 22, 24 of the air passageway terminate at an inlet port assembly 28. The inlet port assembly is affixed to rotate with the tire as the tire rotates against a ground surface 132. Rotation 136 of the tire creates a footprint 134 against surface 132 which in turn introduces compression force 138 into the tire. The compression force 138 in turn is applied at 140 into the air passageway 20 causing segment by segment collapse 137 of the passageway and flow of air in direction 142 as the tire 10 rotates. The inlet port assembly 28 includes a regulator valve assembly 30 and an air entry port 32. Operation of the pump assembly during rotation of the tire 10 causes flow of air 70 with inlet at air entry port 32. Flow of air 70 into the tire cavity 26 is regulated by regulator valve assembly 30, through operation of included valves and actuators (not shown).

Figure 2:
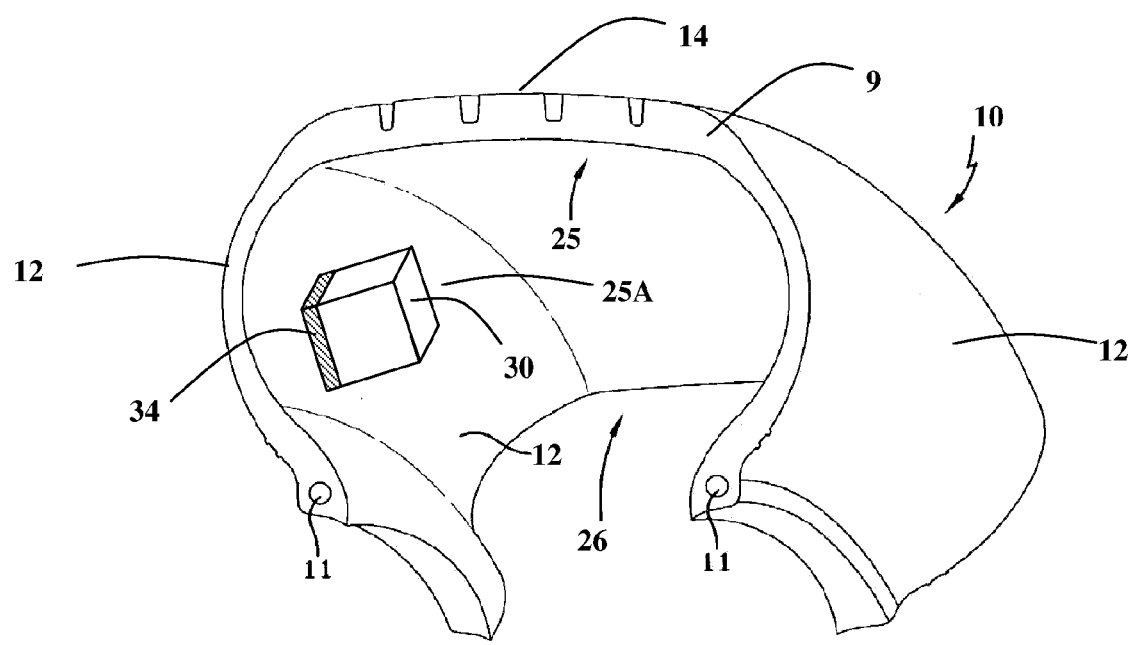
FIG. 2 is a cross sectional schematic diagram showing a regulator valve assembly mounted on an innerliner surface of a tire.

With reference now to FIG. 2, a cross section of tire 10 is shown with two spaced inextensible beads 11 and individual sidewalls 12 extending radially inward from the axial outer edges of tread portion 14 to join the respective beads 11; a supporting carcass 9 for the tread portion 14 and sidewalls 12. An innerliner 25 is disposed radially inward of the carcass 9, the innerliner having a surface 25A facing an interior cavity of the tire 26. Regulator valve assembly 30 is mounted on innerliner surface 25A using adhesive 34.

The regulator valve assembly is secured to the tire innerliner using an adhesive.

Useful adhesives according to the invention are silicone adhesives. Silicone adhesives are known to a person skilled in the art, for example, from European Patent Application Nos. EP 0 118 030 A, EP 0 316 591 A, EP 0 327 847 A, and EP 0 553 143 A, German Patent Application No. DE 195 49 425 A, and U.S. Pat. No. 4,417,042.

In one embodiment, the adhesive is a silicone-based composition, in particular, chosen from acetate, alkoxy, oxime, benzamide and amine silicones. In one embodiment, the adhesive comprises polyorganosiloxanes and organosilicone compounds with acetate, alkoxy, oxime, benzamide and amine hydrolysable groups. Such adhesive compositions are described in patent U.S. Pat. No. 5,378,406 in the quantities stated therein.

In one embodiment, the adhesive is a room temperature crosslinking system such as described in European Patent Application No. 0 327 847 or U.S. Pat. No. 5,077,360. These may be single component or multicomponent systems, in which in the multicomponent systems the catalyst and crosslinking agent may be present separately (for example, disclosed in U.S. Pat. Nos. 4,891,400 and 5,502,144), or other "RTV two-component" silicone systems, in particular platinum-free systems.

"Single component" systems that contain all ingredients needed to form an adhesive composition, are stored with exclusion of atmospheric humidity and/or atmospheric oxygen and, reacting with atmospheric humidity, and cure at the site of use, are particularly preferred. "Neutral" silicone systems may also be used, wherein the reaction of crosslinking agents with water in the ambient air does not give rise to corrosive, acidic, basic or strongly smelling cleavage products. Examples of such systems are disclosed in German Patent No. DE 195 49 425, U.S. Pat. No. 4,417,042 or European Patent No. EP 0 327 847.

Stability of adhesive compositions is typically achieved by adding finely divided solids, also known as fillers, which may be subdivided into those of the organic and inorganic kinds. Inorganic fillers include silica/silicon dioxide (coated or uncoated), chalk (coated or uncoated) and/or zeolites. The latter may additionally also act as desiccants. PVC powder may, for example, be considered as an organic filler. Fillers here generally substantially contribute to the sealing composition having a necessary internal cohesion after application. The stated additives or fillers may be divided into pigments and thixotroping fillers, which are also known as thixotroping agents.

Suitable thixotroping agents include known thixotroping agents such as bentones or kaolins, or also organic compounds such as hydrogenated castor oil or derivatives thereof with polyfunctional amines or the reaction products of stearic acid or ricinoleic acid with ethylenediamine. Co-use of silica, in particular, pyrogenic silica, has proved particularly favorable. Substantially swellable polymer powders may also be considered as thixotroping agents. Examples include polyacrylonitrile, polyurethane, polyvinyl chloride, polyacrylic acid esters, polyvinyl alcohols, polyvinyl acetates and their corresponding copolymers. Particularly good results may be achieved with finely divided polyvinyl chloride powders. Apart from the thixotroping agents, coupling agents such as mercaptoalkylsilane may also be used. It has been found convenient to use a monomercaptoalkyltrialkoxysilane. Mercaptopropyltrimethoxysilane is, for example, commercially conventional.

Properties of an adhesive composition may be further improved if other components are also added to the plastics powder used as thixotroping agent. These include substances categorized as plasticizers or swelling agents and swelling auxiliaries used in plastics.

Plasticizers highly suitable for silicone sealant compositions include silicone oils, preferably polydimethylsiloxanes, and hydrocarbons and/or mixtures thereof, in particular, hydrocarbons or mixtures thereof with a boiling point greater than 200° C., in particular, greater than 230° C.

Pigments and dyes used include substances known for these intended applications, such as titanium dioxide, iron oxides and carbon black.

Storage stability can be improved by adding stabilizers such as benzoyl chloride, acetyl chloride, toluenesulfonic acid methyl ester, carbodiimides and/or polycarbodiimides to the sealing compositions. Olefins with 8 to 20 carbon atoms have proven to be particularly good stabilizers. In addition to their stabilizing action, these may also act as plasticizers or swelling agents. Preferred olefins are those with 8 to 18 carbon atoms, in particular, with the double bond arranged in 1,2-position. Particularly good results are obtained if the molecular structure of these stabilizers is linear.

Application of a silicone adhesive offers sufficiently good adhesion on a surface contaminated by demolding agents such as used in the tire vulcanizing process (bladder release lubricants or agents such as silicone oil and the like applied as a coating to the innerliner surface). Adhesion is considered as sufficient when adhesion to the innerliner is high enough to prevent the regulator valve assembly from detaching during tire life time; although there is no upper limit. Additionally the adhesive should remain elastic during tire life time and be resistant to fatigue under flexing and shearing. Adhesives which fulfill these requirements are of the Loctite® 5900 series including 5900, 5910 and 5970 from Henkel.

The adhesive also serves as a sealant to minimize air leakage from the tire cavity. Referring again to FIGS. 1 and 2, applied adhesive 38 acts to fill voids between the air inlet assembly 28 and sidewall 12, preventing air leaks through the sidewall at the point of the air inlet assembly mount.

Cleaning of the tire innerliner surface, for example to remove silicone release agents, before application of the silicone adhesive is optional. The surface may be cleaned using a hot water high pressure (HWHP) water jet at about 65° C. and up to 90 bar. Mechanical cleaning (grinding, buffing) is not needed.

As the regulator valve assembly is applied to cured tires, the innerliner surface may or may not feature a smooth portion. The smooth portion, if present, results from the fact that tire curing bladders are typically ground at their center to remove imperfections and flash resulting from the bladder production process. For tires to be equipped with a regulator valve assembly, tire curing bladders having a smooth portion wider than about 50% of the damper width (i.e., less or equal to about 60 mm) may be used. Alternatively, the innerliner surface to which the regulator valve assembly is attached may be textured due to the imprinted pattern of the curing bladder, intended to provide a path for escape of gas released during cure.

In one embodiment, the silicone adhesive may be applied in its uncured state to the surface of the regulator valve assembly attached to the innerliner surface. The applied silicone adhesive may be spread out using rollers or spatulas to ensure the adhesive mixes with contaminants on the innerliner surface, such as release agents, and acts as a solvent to them. The adhesive attaching the regulator valve assembly to the innerliner surface is then allowed to cure as directed.

Alternatively, the silicone adhesive may be partially precured prior to application to the regulator valve assembly or to the innerliner. In this embodiment, the silicone adhesive may be preformed in a mold to the desired shape, and partially cured to obtain a manually applicable form that retains tackiness sufficient to adhere the regulator valve assembly to the innerliner. The silicone adhesive may be precured to a vulcanization state sufficient to maintain shape but still retaining tackiness.

In one embodiment, the vulcanization state of the precured silicone adhesive is between its $T_{20}$ and $T_{80}$ vulcanization states after the partial cure cycle. In another embodiment, the vulcanization state of the second rubber composition phase is between its $T_{40}$ and $T_{60}$ vulcanization states after the normal cure cycle. The precured silicone adhesive is further curable and may obtain a second cure state upon cure after application to the regulator valve assembly and innerliner. The "T-points" (ie, $T_{90}$, $T_{25}$, $T_{80}$, etc.) represent cure states, are recognizable to one skilled in the art and are defined in ASTM D2084, D5289 and ISO 6502 and are fully described in a presentation given by H. G. Buhrin at Tyretech '90 in Brighton, England, Nov. 5-6 1990. The T-points may be determined using the Flexsys Rubber Process Analyzer (RPA) 2000. A description of the RPA 2000, its capability, sample preparation, tests and subtests can be found in these references. H A Pawlowski and J S Dick, Rubber World, June 1992; J S Dick and H A Pawlowski, Rubber World, January 1997; and J S Dick and J A Pawlowski, Rubber & Plastics News, Apr. 26 and May 10, 1993.

The precured silicone adhesive will also retain sufficient tackiness to allow adhesion of the regulator valve assembly to the innerliner. The "tackiness" or tack of a rubber component is a relative indication of the ability of the component to adhere and remain adhered to tire components during the building process. Such tackiness may be measured by a technique described in the publication "Role of Phenolic Tackifiers in Polyisoprene Rubber," F. L. Magnus and G. R. Hamed, Rubber Chemistry and Technology, vol. 64, pages 65-73 (1991).

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An air maintenance tire and pump assembly comprising:
a tire having two spaced inextensible beads; a ground contacting tread portion; a pair of individual sidewalls extending radially inward from the axial outer edges of said tread portion to join the respective beads; a supporting carcass for the tread portion and sidewalls; an innerliner disposed radially inward of the carcass, the innerliner having a innerliner surface facing an interior cavity of the tire;
an elongate substantially annular air passageway enclosed within a bending region of the tire, the air passageway operatively closing and opening segment by segment as the bending region of the tire passes through a rolling tire footprint to pump air along the air passageway;
an air inlet port assembly coupled to and in air flow communication with the air passageway at an inlet air passageway junction, the air inlet port assembly operable to channel inlet air from outside of the tire into the air passageway, the air inlet port assembly comprising a regulator assembly, the regulator assembly having a mounting surface;
the mounting surface adhered to the innerliner surface with a silicone adhesive.

* * * * *